United States Patent [19]

Nagayoshi et al.

[11] Patent Number: 4,867,671
[45] Date of Patent: Sep. 19, 1989

[54] APPARATUS FOR MANUFACTURING RESIN TUBE

[75] Inventors: Akio Nagayoshi; Kiyoharu Nagayoshi, both of Sakai, Japan

[73] Assignees: U.C. Industry Co., Ltd., Osaka; Tonen Sekiyukagku Kabushiki Kaisha, Tokyo, both of Japan

[21] Appl. No.: 105,781

[22] Filed: Oct. 8, 1987

[30] Foreign Application Priority Data

Oct. 11, 1986 [JP] Japan .................. 61-241725
Oct. 11, 1986 [JP] Japan .................. 61-241726

[51] Int. Cl.⁴ .......................................... B29C 47/08
[52] U.S. Cl. ........................... 425/391; 156/244.13; 156/429; 156/431; 156/500; 242/72 R; 242/72.1; 269/48.1; 425/325; 425/402
[58] Field of Search ............ 425/72.1, 325, 402, 425/391, 505; 156/244.13, 500, 429-432, 450, 353; 264/312, 209.2; 242/72.1, 72 R; 269/48.1

[56] References Cited

U.S. PATENT DOCUMENTS

| | | | |
|---|---|---|---|
| 862,169 | 8/1907 | Jenner | 425/402 X |
| 2,144,467 | 1/1939 | Streich | 425/391 |
| 2,378,211 | 6/1945 | Furness | 425/325 X |
| 2,398,876 | 4/1946 | Bailey | 156/244.13 X |
| 2,460,325 | 2/1949 | Whitson et al. | 242/72.1 |
| 3,532,580 | 10/1970 | Kanao | 156/430 X |
| 3,890,181 | 6/1975 | Stent et al. | 156/244.13 X |
| 4,149,924 | 4/1979 | Grobard | 156/353 |
| 4,401,041 | 8/1983 | De Polo | 156/431 X |

Primary Examiner—Richard L. Chiesa
Attorney, Agent, or Firm—Armstrong, Nikaido, Marmelstein, Kubovcik & Murray

[57] ABSTRACT

An apparatus for manufacturing a resin tube comprising: (a) a support means; (b) a central support by the support means and extending therefrom; (c) a pair of operating means supported by the central shaft at two separate positions; (d) a plurality of rotatable forming rolls each supported by the operating means at both ends thereof in such a manner that the rotatable forming rolls are arranged circularly around the central shaft and that a cylindrical envelope formed by the rotatable forming rolls has a radius changeable by operation of the operating means; and (e) a plurality of flexible link means each connected between one end of each rotatable forming roll and a driving means for simultaneously rotating the rotatable forming rolls in the same direction at any radius of the envelope. Because of this structure, the apparatus can manufacture a resin tube of any size simply by operating the operating means.

9 Claims, 9 Drawing Sheets

APPARATUS FOR MANUFACTURING RESIN TUBE

BACKGROUND OF THE INVENTION

The present invention relates to an apparatus for manufacturing a resin tube, and particularly to an apparatus suitable for manufacturing a resin tube of a large diameter.

In general, a conventional apparatus for manufacturing a resin tube of a large diameter comprises a plurality of rotatable forming rolls arranged on a hypothetical cylindrical surface, one end of each rotatable forming roll being supported by a support base like a cantilever and operably connected with a driving means. Each rotatable forming roll is slightly inclined with respect to the axis of the above hypothetical cylindrical surface. An extruder is positioned near the rotatable forming rolls, and an extruded resin ribbon is supplied to the forming rolls so that it is wound around the forming rolls with its side edges overlapped. With all of the forming rolls rotating simultaneously in the same direction, the resin ribbon is continuously conveyed toward the tip ends of the rotatable forming rolls while being formed into a tubular body with its edges overlapped. Since the resin ribbon is still sufficiently hot on the rotatable forming rolls, the partially overlapped resin ribbon is completely formed into a resin tube which is withdrawn continuously from the tip ends of the rotatable forming rolls.

However, the resin tube-forming apparatus of the above structure cannot produce resin tubes of different diameters because the rotatable forming rolls are arranged at a fixed diameter. Further, the rotatable forming rolls of a cantilever type are likely to undergo deformation during the tube forming operations, because cantilevers cannot remain straight under a large load imposed by a resin tube being formed thereon, which has a large diameter.

OBJECT AND SUMMARY OF THE INVENTION

An object of the present invention is, therefore, to provide an apparatus capable of manufacturing a resin tube of a different diameter by changing a radius of an envelope formed by a plurality of rotatable forming rolls which remain completely straight even under a heavy load of a resin tube being formed.

Intense research in view of the above object has revealed that resin tubes of different diameters can be produced without any problems as mentioned above by using a plurality of rotatable forming rolls which are supported at both ends and whose radial positions are changeable.

Thus, the apparatus for manufacturing a resin tube according to the present invention comprises:

(a) a support member;

(b) a central shaft supported by the support member and extending therefrom;

(c) a pair of operating means supported by the central shaft at two separate positions;

(d) a plurality of rotatable forming rolls each supported by the operating means at both ends thereof in such a manner that the rotatable forming rolls are arranged circularly around the central shaft and that a cylindrical envelope formed by the rotatable forming rolls has a radius changeable by operating of the operating means; and (e) a plurality of flexible link means each connected between one end of each rotatable forming roll and a driving means for simultaneously rotating the rotatable forming rolls in the same direction at any radius of the envelope.

BRIEF DESCRIPTION OF THE INVENTION

DETAILED DESCRIPTION OF THE PREFERRED EMBODIMENTS

Figure 1:
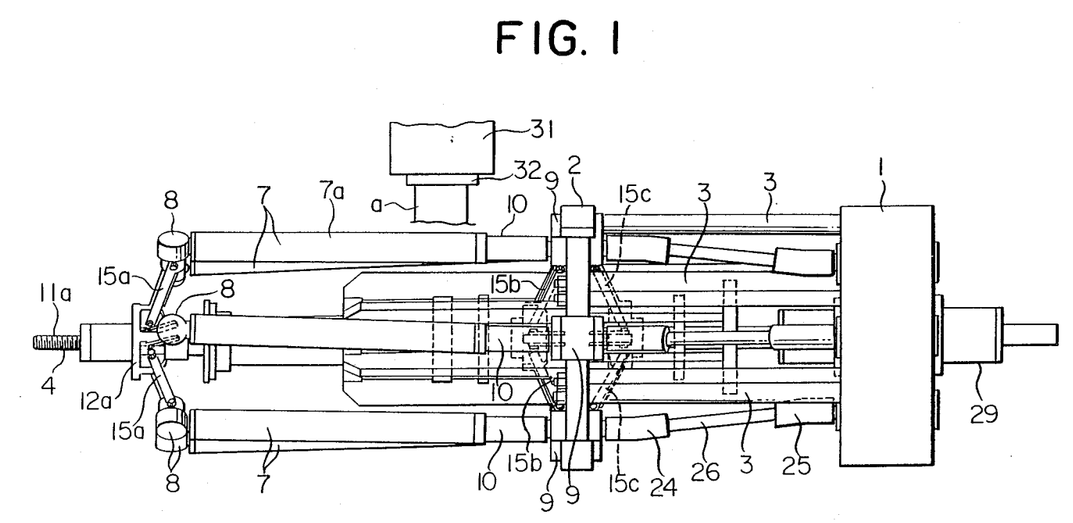
FIG. 1 is a side view of the apparatus for manufacturing a resin tube according to one embodiment of the present invention.
Figure 3:
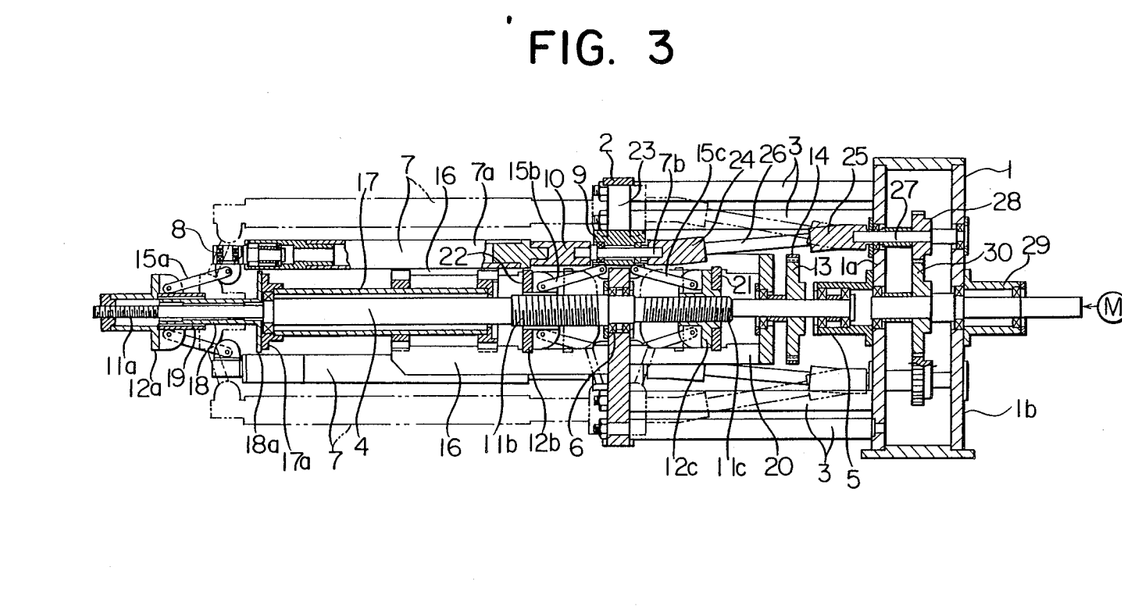
FIG. 3 is a cross-sectional view of the apparatus of FIG. 1.

Referring to FIGS. 1 and 3, the apparatus for manufacturing a resin tube according to one embodiment of the present invention comprises a base 1, a support plate 2, a plurality of support rods 3 for fixing the support plate 2 to the base 1, a central shaft 4 extending from the base 1 and rotatably supported by the base 1 and the support plate 2 via bearing 5 and 6.

Figure 2:
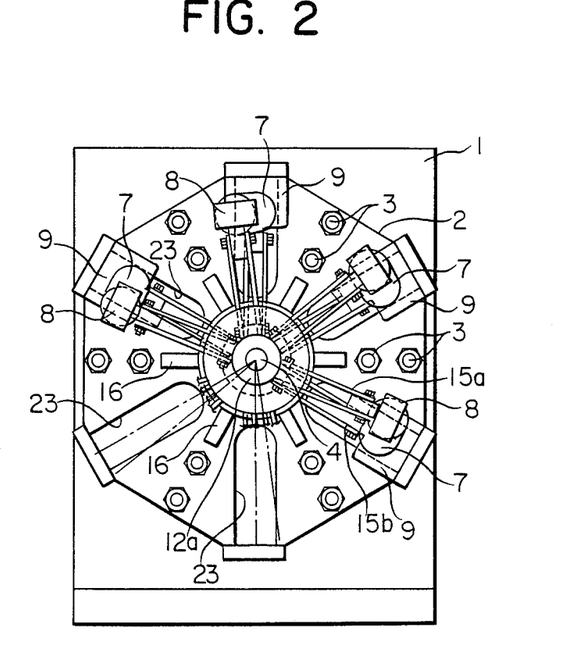
FIG. 2 is a side view of the apparatus of FIG. 1.

According to this embodiment, the support plate 1 is provided with 6 radial slots 23 extending from near the bearing 6 to near a periphery of the support plate 2 with equal circular intervals as shown in FIG. 2. The support plate 2 is also fixedly provided with a lateral support member 16 extending laterally from the support plate 2 and having 6 support blades radially projecting therefrom with equal circular intervals.

The central shaft 4 has a first threaded portion 11a at a tip end thereof, a second threaded portion 11b near the support plate 2 on the same side as the first threaded portion 11a, and a third threaded portion 11c near the support plate 2 on the opposite side to the first and second threaded portions 11a, 11b. The first threaded portion 11a and the second threaded portion 11b have the same spiral direction, and the third threaded portion 11c has an opposite spiral direction to those of the first and second threaded portions 11a, 11b.

Movably mounted on the first threaded portion 11a is a first operating means comprising a first movable member 12a having a threaded inner wall threadably engaging the first threaded portion 11a, and a plurality of first link rods 15a pivotally connected to the first movable member 12a. The first link rods 15a extend from the first movable member 12a radially with equal intervals. In this embodiment, the number of the first link rods 15a is 6. Likewise, a second operating means comprising a second movable member 12b is threadably mounted on the second threaded portions 11b, and 6 link rods 15b are pivotally connected to the second movable member 12b and extend therefrom radially with equal intervals. And a third operating means comprises a third movable member 12c threadably engaging the third threaded portion 11c, and 6 link rods 15c pivotally connected to the third movable member 12c and extending therefrom radially with equal intervals.

The apparatus for manufacturing a resin tube according to this embodiment comprises a plurality of (6) rotatable forming rolls 7, and a tip end of each rotatable forming roll 7 is pivotally supported by one of the first link rods 15a at a tip end thereof via a first bearing 8, and a rear end of each rotatable forming roll 7 is pivotally supported by each second and third link rod 15b, 15c and flexibly connected with a flexible link means, which will be described in detail below.

Each flexible link means comprises a short shaft 7b connected to a roll body 7a of each rotatable forming roll 7 via a universal joint 10, a link rod 26 connected to the short shaft 7b via a universal joint 24, and a shaft 27 connected to the link rod 26 via a universal joint 25 and rotatably supported by bearings mounted on a front wall 1a and a rear wall 1b of the base 1. The short shaft 7b is rotatably supported by a second bearing 9 which is slidably received in the radial slot 23 of the support plate 2. The second bearing 9 is pivotally supported by the second link rod 15b and the third link rod 15c on both sides with respect to the support plate 2.

In this embodiment, a tubular body 17 is fixed to the lateral support plate 16 in such a manner that it surrounds the central shaft 4. The tubular body 17 has a flange 17a at a tip end thereof, which is fixed to a flange 18a of an inner tube member 18 surrounding the central shaft 4 with a small gap which permits the central shaft 4 to rotate freely in the inner tube member 18. The inner tube member 18 is provided with a spline extending axially on an outer surface therefore, and on outer tube ember 19 fixed to the first movable member 12a is provided, on an inner surface thereof, with an axial spline engageable with the spline of the inner tube member 18. Because of this structure, the first movable member 12a can move back and forth along the central shaft 4 without rotation by the rotation of the central shaft 4. Incidentally, by changing an angular position of either of the inner tube member 18 or the outer tube member 19 around the axis of the central shaft 4, the direction of each rotatable forming roll 7 can be adjusted along the axis of the central shaft 4. Preferably, the rotatable forming rolls 7 are slightly inclined on an envelope formed thereby as shown in FIG. 2. The angular adjustment of the first movable member 12a can also be achieved by changing the angular position of the inner tube member 18 relative to the tubular body 17.

The lateral support plate 16 has a stopper 22 around the central shaft 4, which regulates the leftward movement of the second movable member 12b. Likewise, a lateral support plate 20 fixed to the support plate 2 has a stopper 21 around the central shaft 4, which regulates the rightward movement of the third movable member 12c. Due to the stoppers 21, 22, a minimum radius of the envelope formed by the rotatable forming rolls 7 is determined.

The central shaft 4 is fixedly provided with a gear 13 operably engageable with a timing belt 14 which is connected with a driving means (not shown). Through the timing belt 14 and the gear 13, the central shaft 4 is rotated independently of the rotatable forming rolls 7.

As is clearly shown in FIG. 3, each shaft 27 is fixedly provided with a small gear 28 meshed with a large gear 30 fixed to a shaft rotatably supported by the base 1 via a bearing 29, and the above shaft is connected with a driving means M. Since each of the small gears 28 is meshed with the large gear 30, the rotatable forming rolls 7 rotate simultaneously in the same direction.

An extruder 31 with a die 32 is positioned near the root portions of the rotatable forming rolls 7, and an extruded resin ribbon "a" is supplied to the forming rolls with a proper inclination so that it is continuously wound around the rotatable forming rolls with its side edges overlapped.

With the above-described apparatus, the manufacturing of a resin tube will be described in detail below.

First, to achieve the desired radius of envelope formed by the rotatable forming rolls 7, the central shaft 4 is rotated leftward or rightward to move the first movable member 12a along the central shaft 4 by the desired distance. Since the first threaded portion 11a and the second threaded portion 11b have the same spiral direction and the third threaded portion 11c has an opposite spiral direction, the first movable member 12a and the second movable member 12b move in the same direction while the third movable member 12c moves in the opposite direction. Because the rotatable forming rolls 7 are supported by the first, second and third movable members 12a, 12b, 12c via pivotally movable link rods 15a, 15b, 15c, the radial positions of the rotatable forming rolls 7 are changed by axially moving the movable members 12a, 12b, 12c. In other words, the radius of the envelope formed by the rotatable forming rolls 7 is adjusted by rotating the central shaft 4, so that a resin tube to be formed each have the desired diameter.

With this position, each rotatable forming roll 7 is rotated via each flexible link means operably connected with the motor M simultaneously in the same direction. The resin ribbon "a" ejected from the extruder 31 through the die 32 with the desired inclination with respect to the axis of the central shaft 4 is supplied onto the rotatable forming rolls 7. The rotation speed of the rotatable forming rolls 7 and the inclination and supply speed of the resin ribbon "a" are adjusted so that the resin ribbon "a" is wound around the rotatable forming rolls 7 with its side edges overlapped to the desired degree. Since the resin ribbon "a" is still hot when overlapped, a partially overlapped resin ribbon is formed into a resin tube which is continuously withdrawn from the tip ends of the rotatable forming rolls 7.

Next, if a resin tube of a different diameter is desired, the central shaft 4 is rotated to cause the rotatable forming rolls 7 to have the desired radius of envelope via the operating means. Like this, changing the radius of envelope of the rotatable forming rolls 7 can easily be conducted simply by rotating the central shaft 4.

In this embodiment, the link rods 15a, 15b, 15c have the same length, but it should be noted that the first link rods 15a may be slightly longer or shorter than the second link rods 15b and the third link rods 15c. If the first link rods 15a are longer than the second and third ones, the radius of envelope becomes larger near the tip ends of the rotatable forming rolls 7, ensuring the lateral movement of a resin tube being formed, which is made of a rapidly solidifiable resin material, toward the tip ends of the rotatable forming rolls 7. On the contrary, if the first link rods 15a are shorter, the radius of envelope becomes smaller near the tip ends of the rotatable forming rolls 7. Thus, smooth conveyance of a resin tube being formed toward the tip ends of the rotatable forming rolls with little resistance can be achieved even if the resin tube is produced from a resin material shrinkable when solidified.

Further, the first movable member 12a may be advanced by several pitches than the second and third movable members 12b, 12c, so that the angle of the first link rods 15a to the axis of the central shaft 4 is larger than those of the second and third link rods 15b, 15c, resulting in a larger radius of envelope near the tip ends of the rotatable forming rolls 7. Of course, it is also possible to make the angle of the first link rods 15a smaller than those of the second and third link rods 15b, 15c, by letting the first movable member 12a behind by several pitches.

Figure 4:
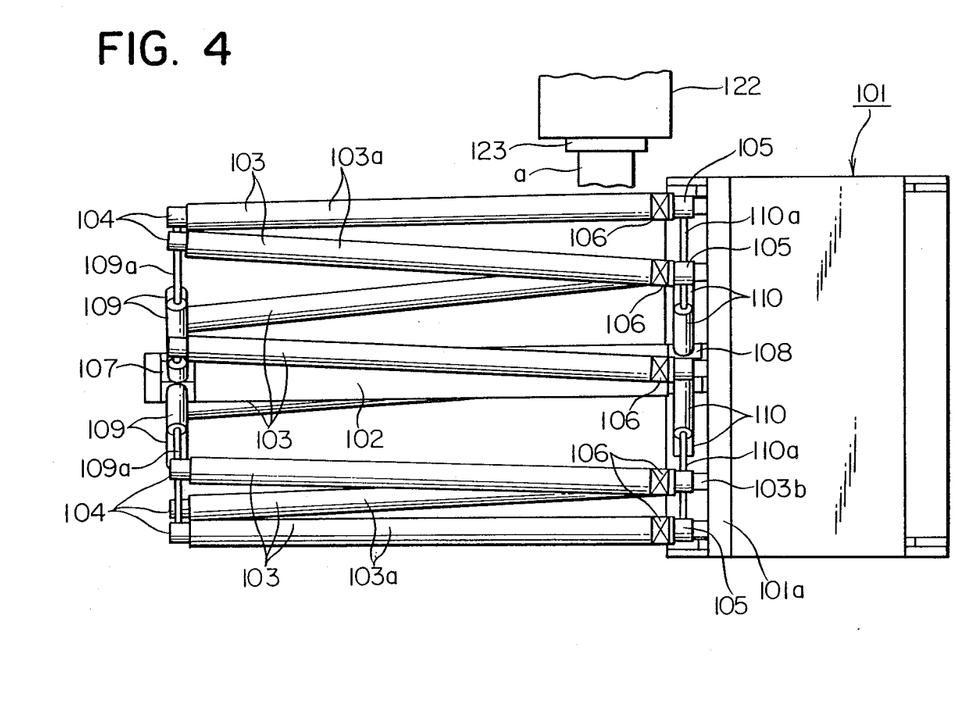
FIG. 4 is a side view of the apparatus for manufacturing a resin tube according to another embodiment of the present invention.
Figure 5:
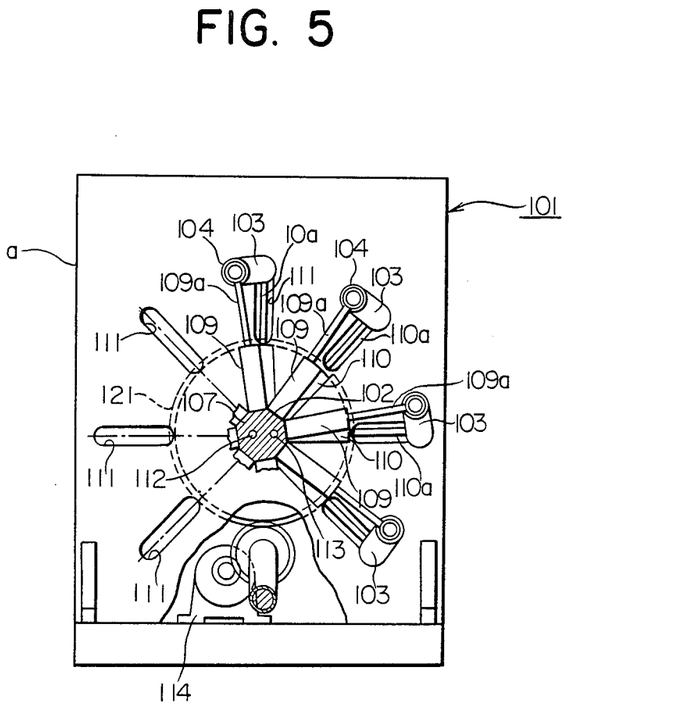
FIG. 5 is a side view of the apparatus of FIG. 4.
Figure 6:
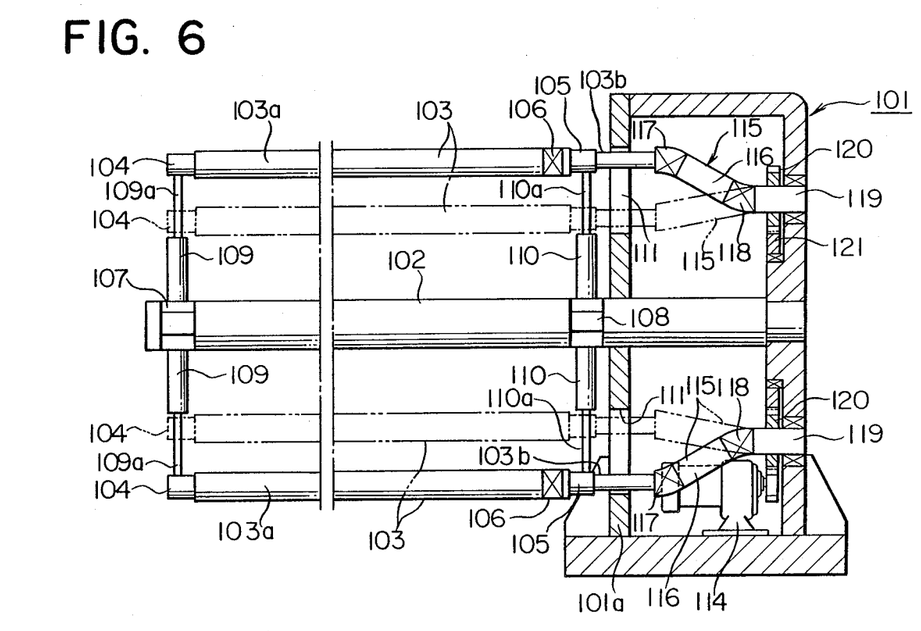
FIG. 6 is a cross-sectional view of the apparatus of FIG. 4.

FIGS. 4-6 show another embodiment of the present invention. The apparatus of this embodiment comprises a base 101 and a central shaft 102 fixed to the base 101 and having two polygonal portions 107, 108; a first polygonal portion 107 near the tip end of the central shaft 102 and a second polygonal portion 108 near the base 101.

Fixed to the first polygonal portion 107 of the central shaft 102 are a plurality of hydraulic pistons 109 each provided with a radially projectable piston rod 109a. In this embodiment, the number of the hydraulic pistons is 8. Likewise, 8 hydraulic pistons 110 each provided with a radially projectable piston rod 110a are fixed to the second polygonal portion 108 of the central shaft 102. Connected to a tip end of each piston rod 109a, 110a via bearings 104, 105 is a rotatable forming roll 103. Because the hydraulic pistons 109, 110 extend radially from the central shaft 102 with equal intervals, 8 rotatable forming rolls 103 connected to the piston rods 109a, 110a at both ends are arranged circularly, forming a cylindrical envelope whose radius is determined by the length of each piston rod 109a, 110a. Further, as is shown in FIG. 5, each rotatable forming roll 103 is preferably slightly inclined on the above cylindrical envelope with respect to the axis of the central shaft 102 to facilitate the formation of a resin tube from a resin ribbon.

As is clearly shown in FIGS. 4, 6, each rotatable forming roll 103 comprising a roll body 103a, a universal joint 106 and a bearing 105 is connected to a flexible link means 115 comprising a short shaft 103b, universal joints 117, 118, a link rod 116 and a shaft 119. Each short shaft 103b is received in each radial slot 111 of the base 101, so that it can move radially in the radial slot 111 as the piston rods 109a 110a are projected or retracted from the hydraulic pistons 109, 110. Each short shaft 103b is connected to the link rod 116 via the universal joint 117, and the link rod 116 is connected to the shaft 119 via the universal joint 118. Thus a rotational movement is conveyed from the shaft 119 to rotatable forming roll 103 through the flexible link means 115 of the above constitution at any radius of the envelope formed by the rotatable forming rolls 103.

Each shaft 119 is fixedly provided with a small gear 120 meshed with a large gear 121 which is in turn operably connected with a motor 114. Accordingly, the motor 114 can drive all of the shafts 119 simultaneously, which in turn rotate the rotatable forming rolls 103 via the flexible link means 115.

As is shown in FIG. 5, the central shaft 102 has two paths axially extending therein: one denoted as 112 is for supplying a hydraulic oil to each hydraulic piston 109, 110, and the other denoted as 113 is for withdrawing a hydraulic oil from each hydraulic piston 109, 110.

In this embodiment too, an extruder 122 equipped with a die 123 for ejecting a resin ribbon "a" is positioned near the root portions of the rotatable forming rolls 103 with such an inclination as to ensure the partial overlapping of the resin ribbon being wound around the rotatable forming rolls 103.

The operation of this apparatus is essentially the same as that of FIGS. 1-3. That is, the radius of envelope of the rotatable forming rolls 103 is adjusted to the desired one by operating the hydraulic pistons 109, 110 by supplying or withdrawing a hydraulic oil through the paths 112, 113. The rotatable forming rolls thus set at the desired radial position are rotated by the motor 114 via the flexible link means 115. With a proper combination of the rotation speed of the rotatable forming rolls, the radius of envelope, the linear speed and inclination of the resin ribbon "a" supplied from the extruder 122, the resin ribbon "a" is partially overlapped on both sides thereof, continuously providing a resin tube.

Like in the embodiment of FIGS. 1-3, the rotatable forming rolls 103 may form a cylindrical envelope whose diameter differs between the tip ends and the root portions of the rotatable forming rolls 103. This can easily be achieved by adjusting a hydraulic oil supplied to or withdrawn from the hydraulic pistons 109 and 110.

Incidentally, the hydraulic pistons in this embodiment may be replaced by electric motors each having a threaded rod projectable therefrom by rotation.

Figure 7:
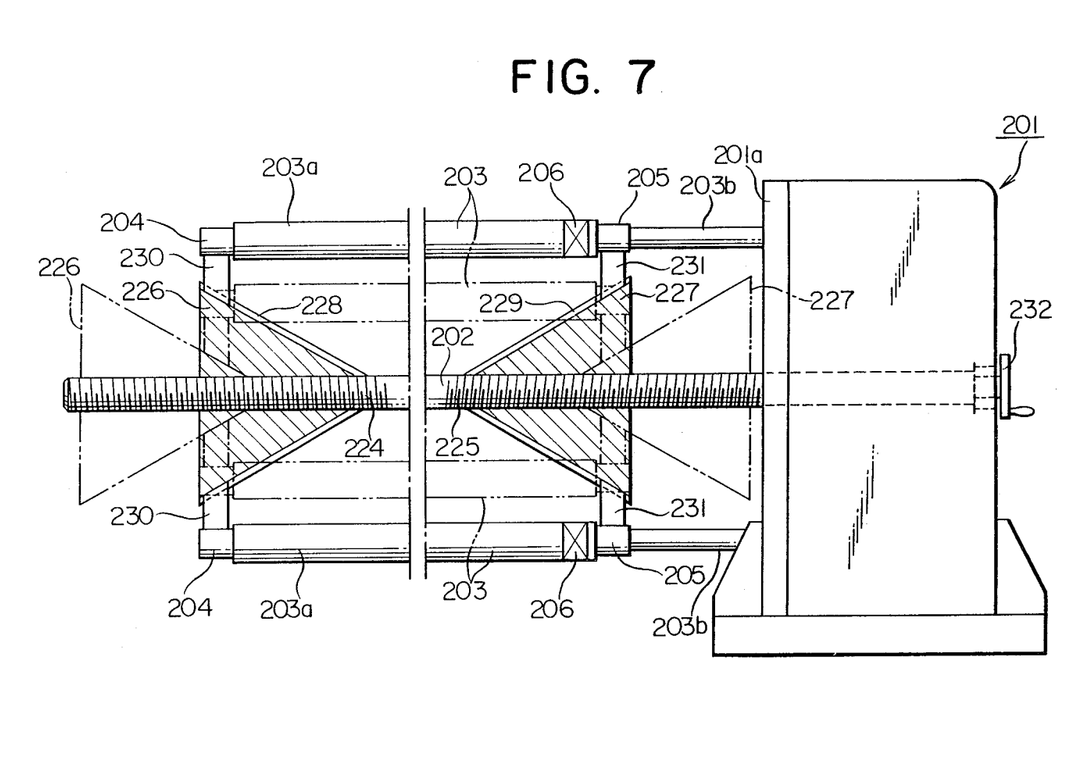
FIG. 7 is a partially cross-sectional side view of the apparatus for manufacturing a resin tube according to a further embodiment of the present invention.
Figure 8:
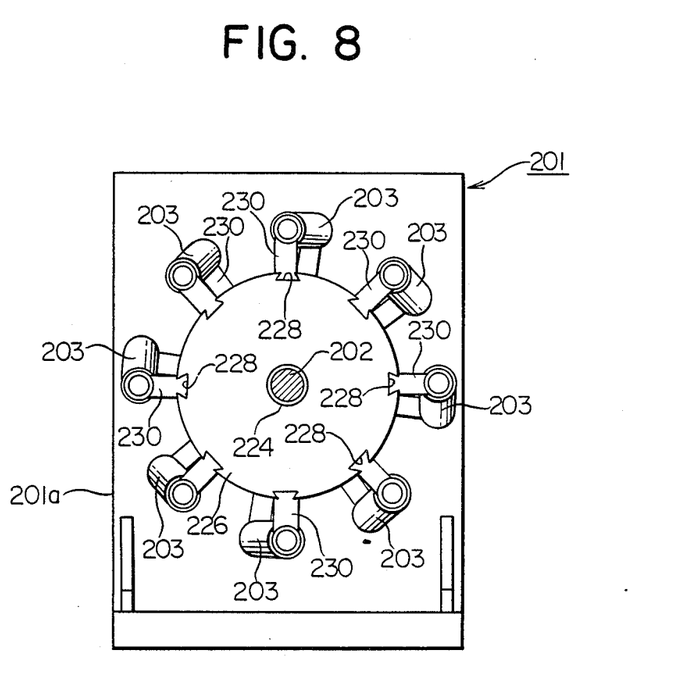
FIG. 8 is a side view of the apparatus of FIG. 7.

FIGS. 7 and 8 show a further embodiment of the present invention. In this embodiment, a central shaft 202 is rotatably supported by a support base 201 and has two threaded portions: a first one denoted as 224 near a tip end thereof and a second one denoted as 225 near a root portion thereof. As is clearly shown in FIG. 7, the threaded portions 224 and 225 have opposite spiral directions. Threadably engaging the first threaded portion 224 is a first conical cam body 226 having a plurality of grooves 228 extending axially on a conical surface thereof. Slidably fitted in each groove 228 is a ridge of a cam follower 230 fixed to a rotatable forming roll 203 via a bearing 204. In this embodiment, since the groove 228 has a triangular cross section and the ridge of the cam follower 230 has a reversed triangular cross section, they are not detachable from each other once engaged. Likewise, a second conical cam body 227 threadably engages the second threaded portion 225 in just the opposite direction, and has a plurality of grooves 229 extending axially on a conical surface thereof. Slidably engaging each groove 229 is a ridge of each cam follower 231 fixed to the rotatable forming roll 203 via a bearing 205. In this embodiment, each of the first conical cam body 226 and the second conical cam body 227 has 8 grooves 228, 229. Accordingly, 8 rotatable forming rolls 203 are supported thereby via the cam followers 204, 205.

Each rotatable forming roll 203 comprising a roll body 203a and a universal joint 206 is connected with a driving means (not shown) via a flexible link means (only a short shaft 203b is depicted). With respect to the flexible link means, the apparatus of this embodiment may be the same as described above.

To operate this apparatus, the central shaft 202 is first rotated manually by a wheel 232. Alternatively, central shaft 202 may be rotated by an electric motor (not shown). The rotation of the central shaft 202 moves the first conical cam body 226 and the second conical cam body 227 axially toward or apart from each other, thereby the rotatable forming rolls 203 are radially expanded or contracted via the cam followers 230, 231 having the ridges slidably engaging the grooves 228, 229 of the conical cam bodies 226, 227. The rotatable forming rolls 203 are rotated in essentially the same way by means of flexible link means (not shown). In this embodiment too, each rotatable forming roll 203 is slightly inclined on a cylindrical envelope formed thereby, with respect to the axis of the central shaft 202 as shown in FIG. 8.

Incidentally, the conical cam bodies 226, 227 have grooves 228, 229 slidably engageable with the ridges of the cam followers 230, 231 in this embodiment, but it should be noted that the conical cam bodies 226, 227 may have ridges slidably engageable with grooves of the cam followers 230, 231, in just the opposite manner to that as shown in FIG. 8 And it should be noted that the central shaft itself may be fixed to the support base 201 and covered by a rotatable tube having two threaded portions as described above. Further, as long as the conical cam bodies 226, 227 can move along the central shaft 202, threadable engagement between the conical cam bodies 226, 227 and the central shaft 202 is not indispensable. In this case, both conical cam bodies may be slidably mounted on the central shaft and moved by plungers, etc.

Figure 9:
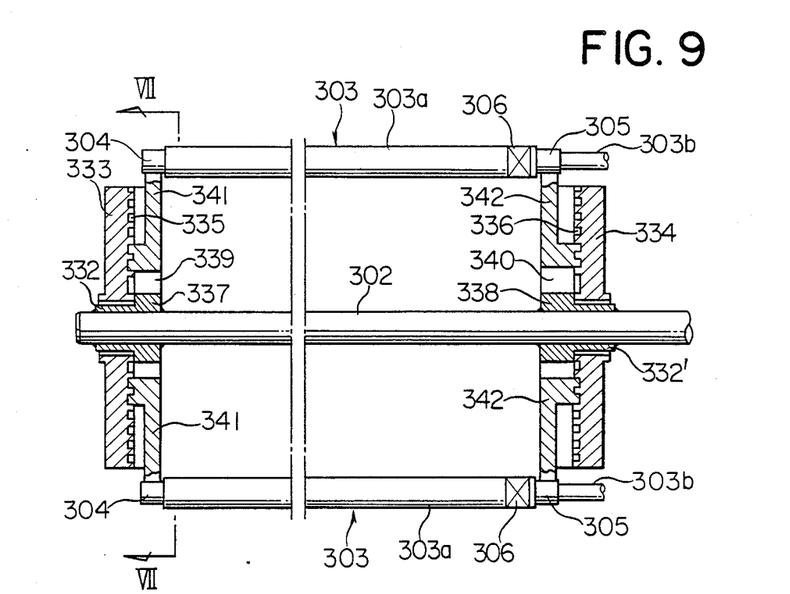
FIG. 9 is a cross-sectional view of the apparatus for manufacturing a resin tube according to a still further embodiment of the present invention.
Figure 10:
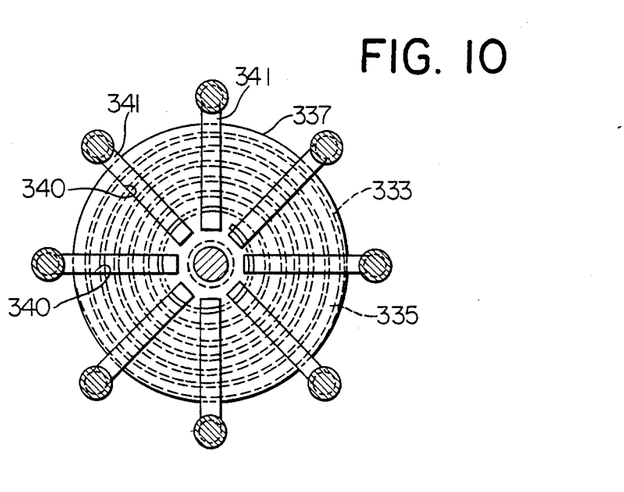
FIG. 10 is a side cross-sectional view of the apparatus taken along the line VII—VII in FIG. 9.

FIGS. 9 and 10 show a still further embodiment of the present invention.

Referring to FIG. 9, a central shaft 302 fixed to a support base (not shown) is provided, near a tip end thereof, with a first rotatable cylindrical shaft 332, and near a root portion thereof, with a second rotatable cylindrical shaft 332'. Fixed to the first rotatable cylindrical shaft 332 is a first circular plate 333 having a spiral groove 335 on its inner side, and fixed to the second rotatable cylindrical shaft 332' is a second circular plate 334 having a spiral groove 336 on its inner side. A first circular support plate 337 is fixed to the central shaft 302 adjacent to the first circular plate 333 inside thereof, and a second circular support plate 338 is fixed to the central shaft 302 adjacent to the first circular plate 334 inside thereof.

Each of the first and second support plates 337, 338 has a plurality of radial slots 339, 340 extending radially from near the central shaft 302 to the periphery thereof as shown in FIG. 10. Slidably received in each radial slot 339, 340 is a movable piece 341, 342 fixed to both ends of a rotatable forming roll 303. Thus, a plurality of the rotatable forming rolls 303 are arranged circularly around the central shaft 302 with support by each pair of movable pieces 341, 342.

Each of the movable pieces 341, 342 has at least one ridge on an outer side of a lower projection thereof, and the ridge is slidably engageable with the groove of the adjacent circular plate 333, 334.

In this structure, both of the first and second circular plates 333, 334 are rotated simultaneously by means of a motor, etc. (not shown), so that each movable piece 341, 342 slides along each radial slot inward or outward through sliding engagement between the groove of the circular plate 333, 334 and the ridge of the movable piece 341, 342. Accordingly, a radius of a cylindrical envelope formed by the rotatable forming rolls 303 is changeable by the rotation of each circular plate 333, 334.

As described above in detail, the apparatus of the present invention can produce a resin tube of any size simply by adjusting the radius of a cylindrical envelope formed by a plurality of rotatable forming rolls by means of operating means which can radially expand or contract by a simple action such as rotation. In addition, since the rotatable forming rolls are supported at both ends by the operating means, they are fully resistant to deformation during the resin tube forming operation. Further, by means of the flexible link means, a plurality of the rotatable forming rolls can be rotated simultaneously at any radius of a cylindrical envelope formed thereby. Because of this structure, the apparatus of the present invention is highly suitable particularly for the production of resin tubes of large diameter.

The present invention has been described referring to the drawings, but it should be noted that any modifications can be made thereto unless they deviate from the scope of the present invention defined in the claims attached hereto.

What is claimed is:

1. An apparatus for manufacturing a resin tube comprising:
   (a) a support means;
   (b) a central shaft rotatably supported by said support means and extending therefrom, said central shaft having two threaded portions which are threaded in opposite spiral directions;
   (c) a pair of operating means supported by said central shaft at two separate positions, each of said operating means comprising a movable member threadably engaging one of said threaded portions of said central shaft so each operating means can move axially by rotation of said central shaft;
   (d) a plurality of rotatable forming rolls each supported by said operating means at both ends thereof in such a manner that said rotatable forming rolls are arranged circularly around said central shaft to form a cylindrical envelope having a radius changeable by operation of said operating means;
   (e) a plurality of links with each link pivotally connected to one of said movable members and to an end of one of said rotatable forming rolls, whereby rotation of said central shaft moves said pair of operating means in opposite directions along said central shaft thereby changing the radius of said envelope formed by said rotatable forming rolls; and
   (f) a plurality of flexible link means each connected between one end of each rotatable forming roll and a driving means for simultaneously rotating said rotatable forming rolls in the same direction at any radius of said envelope formed by said rotatable forming rolls.

2. The apparatus for manufacturing a resin tube according to claim 1, wherein said central shaft is provided with a first threaded portion located at a tip end thereof and a second threaded portion near said support means on the opposite side of said first threaded portion.

3. The apparatus for manufacturing a resin tube according to claim 2, wherein said central shaft further comprises a third threaded portion of the same spiral direction as that of said first threaded portion near said support means on the same side of said first threaded portion, and a third operating means threadably engages said third threaded portion for supporting the root of each rotatable forming roll.

4. The apparatus for manufacturing a resin tube according to claim 1, wherein each end of each of said rotatable forming rolls is pivotally supported by one of said plurality of links through a bearing.

5. The apparatus for manufacturing a resin tube according to claim 1, wherein one of said movable members has a splined inner surface, said central shaft is partially covered by a tubular body with a gap and said tubular body has a splined outer surface which engages said splined under surface of said movable member thereby keeping said operating means from rotating.

6. The apparatus for manufacturing a resin tube according to claim 1, wherein said flexible link means comprises universal joints.

7. The apparatus for manufacturing a resin tube according to claim 6, wherein said flexible link means comprises a link rod connected at both ends to said universal joints and movable radially in a radial slot provided on said support means for permitting the radius of said envelope to change.

8. The apparatus for manufacturing a resin tube according to claim 1, further comprises a base for rotatably supporting one end of said central shaft and one end of each flexible link means.

9. The apparatus for manufacturing a resin tube according to claim 1, wherein said rotatable forming rolls forming said cylindrical envelope are slightly inclined with respect to the axis of said central shaft.

* * * * *